United States Patent
Chen (10) Patent No.: US 9,287,782 B2
(45) Date of Patent: Mar. 15, 2016

(54) HIGH EFFICIENCY BI-DIRECTIONAL DC CONVERTER AND CONTROL METHOD THEREOF

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 225 days.

(21) Appl. No.: 14/068,262

(22) Filed: Oct. 31, 2013

(65) Prior Publication Data

US 2014/0145679 A1    May 29, 2014

(30) Foreign Application Priority Data

Nov. 23, 2012    (CN) .......................... 2012 1 0484789

(51) Int. Cl.
*H02J 7/00*    (2006.01)
*H02M 3/158*    (2006.01)

(52) U.S. Cl.
CPC ................................... *H02M 3/1582* (2013.01)

(58) Field of Classification Search
CPC ...................................................... H02J 7/0065
USPC ......................................................... 320/128
See application file for complete search history.

(56) References Cited

U.S. PATENT DOCUMENTS

| | | | |
|---|---|---|---|
| 5,706,187 A | 1/1998 | Nakamura | |
| 5,898,234 A | 4/1999 | Kitagawa | |
| 5,929,538 A | 7/1999 | O'Sullivan et al. | |
| 7,411,308 B2 | 8/2008 | Parmley | |
| 7,449,798 B2 | 11/2008 | Suzuki et al. | |
| 7,469,541 B1 | 12/2008 | Melton et al. | |
| 7,781,913 B2 | 8/2010 | Wang | |
| 7,839,018 B2 | 11/2010 | Chen et al. | |
| 8,093,756 B2 | 1/2012 | Porter et al. | |
| 2002/0041502 A1* | 4/2002 | Ulinksi et al. | 363/37 |
| 2002/0051366 A1* | 5/2002 | Oh | 362/549 |

(Continued)

FOREIGN PATENT DOCUMENTS

| | | |
|---|---|---|
| CN | 101447677 A | 6/2009 |
| CN | 102723863 A | 10/2012 |

OTHER PUBLICATIONS

Tseng, S.-Y.; Kuo, J.-S.; Wang, S.-W.; Hsieh, C.-T., "Buck-Boost Combined with Active Clamp Flyback Converter for PV Power System," Power Electronics Specialists Conference, 2007. PESC 2007. IEEE, pp. 138-144, Jun. 17-21, 2007.

*Primary Examiner* — Suchin Parihar
(74) *Attorney, Agent, or Firm* — Michael C. Stephens, Jr.

(57) ABSTRACT

Disclosed herein are bi-directional DC converter circuits and control methods. In one embodiment, a method of controlling a bi-directional DC converter, can include: (i) detecting whether there is an input power supply at an input port, where the bi-directional DC converter comprises a single magnetic element; (ii) operating the bi-directional DC converter in a first operation mode to charge a battery when the input power supply is detected at the input port; (iii) operating the bi-directional DC converter in a second operation mode to transfer power from the battery to an output port for a load when the input power supply is not detected at the input port; and (iv) transferring power through the single magnetic element in both the first operation mode and the second operation mode.

20 Claims, 5 Drawing Sheets

(56) References Cited

U.S. PATENT DOCUMENTS

| | | |
|---|---|---|
| 2004/0183982 A1 | 9/2004 | Bruno et al. |
| 2005/0208344 A1* | 9/2005 | Tan .................................. 429/7 |
| 2008/0054855 A1* | 3/2008 | Hussain et al. ............... 320/162 |
| 2008/0062724 A1* | 3/2008 | Feng et al. ...................... 363/17 |
| 2008/0197709 A1 | 8/2008 | Wakitani et al. |
| 2010/0038965 A1 | 2/2010 | Rohner et al. |
| 2010/0138062 A1 | 6/2010 | Zheng et al. |
| 2010/0198421 A1 | 8/2010 | Fahimi et al. |
| 2010/0207452 A1 | 8/2010 | Saab |
| 2011/0006607 A1 | 1/2011 | Kwon et al. |
| 2011/0218692 A1 | 9/2011 | Li |
| 2011/0245986 A1 | 10/2011 | Campanile et al. |
| 2012/0092903 A1* | 4/2012 | Nania et al. ..................... 363/34 |
| 2014/0036550 A1* | 2/2014 | Yang et al. ................. 363/21.12 |
| 2014/0042813 A1* | 2/2014 | Zilberberg et al. ............. 307/52 |
| 2014/0084684 A1* | 3/2014 | Kung .............................. 307/19 |
| 2015/0035493 A1* | 2/2015 | Kung ............................. 320/128 |

* cited by examiner

FIG. 4

HIGH EFFICIENCY BI-DIRECTIONAL DC CONVERTER AND CONTROL METHOD THEREOF

RELATED APPLICATIONS

This application claims the benefit of Chinese Patent Application No. 201210484789.3, filed on Nov. 23, 2012, which is incorporated herein by reference in its entirety.

FIELD OF THE INVENTION

The present invention relates to the field of power electronics, and more particularly to high efficiency bi-directional DC converters and control methods.

BACKGROUND

A DC-to-DC converter is a type of power converter that converts a source of direct current (DC) from one voltage level to another. DC converters are utilized in portable electronic devices, such as cellular phones and laptop computers, because these are supplied with power primarily from batteries. In addition, such devices may contain several sub-circuits, each requiring a different voltage level from that supplied by the battery or an external supply. Further, the battery voltage declines over time upon draining of its stored power. Most DC to DC converters also regulate the output voltage.

SUMMARY

In one embodiment, a method of controlling a bi-directional DC converter, can include: (i) detecting whether there is an input power supply at an input port, where the bi-directional DC converter comprises a single magnetic element; (ii) operating the bi-directional DC converter in a first operation mode to charge a battery when the input power supply is detected at the input port; (iii) operating the bi-directional DC converter in a second operation mode to transfer power from the battery to an output port for a load when the input power supply is not detected at the input port; and (iv) transferring power through the single magnetic element in both the first operation mode and the second operation mode.

In one embodiment, a bi-directional DC converter can include: (i) a single magnetic element through which power is configured to be transferred in both a first operation mode and a second operation mode; (ii) a detection circuit configured to determine whether there is an input power supply at an input port; (iii) the bi-directional DC converter being configured to operate in the first operation mode to charge a battery when the input power supply is detected at the input port; and (iv) the bi-directional DC converter being configured to operate in the second operation mode to transfer power from the battery to an output port for a load when the input power supply is not detected at the input port.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
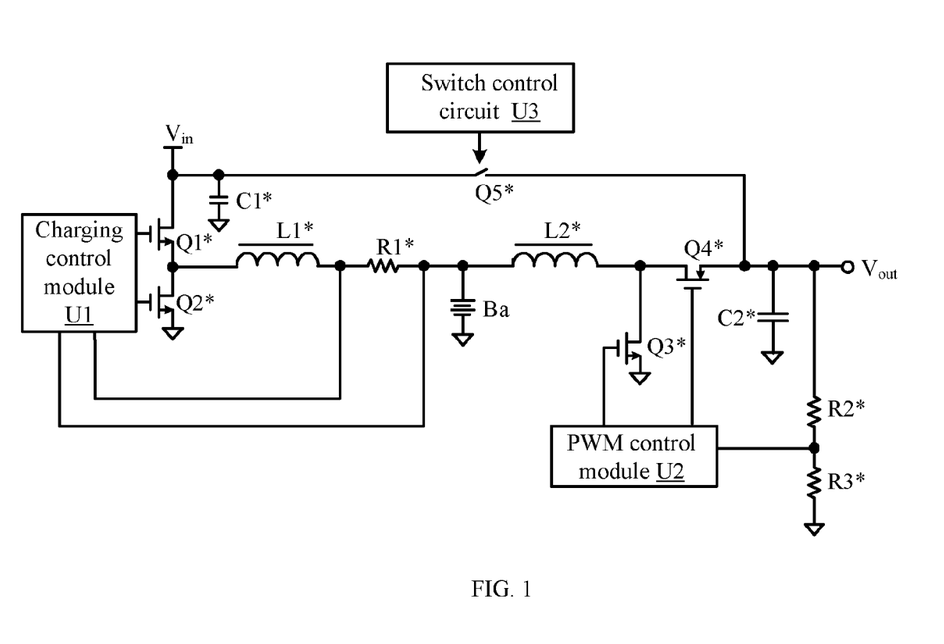
FIG. 1 is a schematic diagram of an example DC converter.

DC converters are used in many applications, such as solar photovoltaic power generation systems, aerospace power supply systems, mobile communication backup power supply systems, secondary battery charging/discharging systems, and so on. FIG. 1 is a schematic diagram of an example DC converter. This particular example mainly includes three parts: a first power stage circuit and a charging control module thereof, a second power stage circuit and a pulse-width modulation (PWM) control module thereof, and a power transmission branch. The DC converter can also include lithium rechargeable battery Ba. For example, the first power stage circuit can be a synchronous buck mode charging circuit that includes capacitor C1*, power switches Q1* and Q2*, inductor L1*, and resistor R1*.

The switching actions of power switches Q1* and Q2* can be controlled by charging control module U1 which uses the input power to charge the lithium battery. The second power stage circuit can be a synchronous boost mode voltage converter circuit that includes inductor L2*, power switches Q3* and Q4*, capacitor C2*, and dividing resistors R2* and R3*. The switching actions of power switches Q3* and Q4* may be controlled by PWM control module U2, which can convert the lithium battery voltage into output voltage $V_{out}$ supplied to a load. The power transmission branch can include switch Q5* and switch control circuit U3, and may be used to transmit the input power to the output port to supply the load.

Typically, when there is an input power supply ($V_{in}$) at the input port, the synchronous buck charging circuit can charge lithium battery Ba. When there is no input power supply at the input port, the lithium battery voltage can be converted into the output voltage to supply to the load by the synchronous boost mode voltage converter circuit. However, this example DC converter utilizes at least four switches, two inductors, and two capacitors, and has a relatively complex control circuit.

In one embodiment, a bi-directional DC converter can include: (i) a single magnetic element through which power is configured to be transferred in both a first operation mode and a second operation mode; (ii) a detection circuit configured to determine whether there is an input power supply at an input port; (iii) the bi-directional DC converter being configured to operate in the first operation mode to charge a battery when the input power supply is detected at the input port; and (iv) the bi-directional DC converter being configured to operate in the second operation mode to transfer power from the battery to an output port for a load when the input power supply is not detected at the input port.

Figure 2:
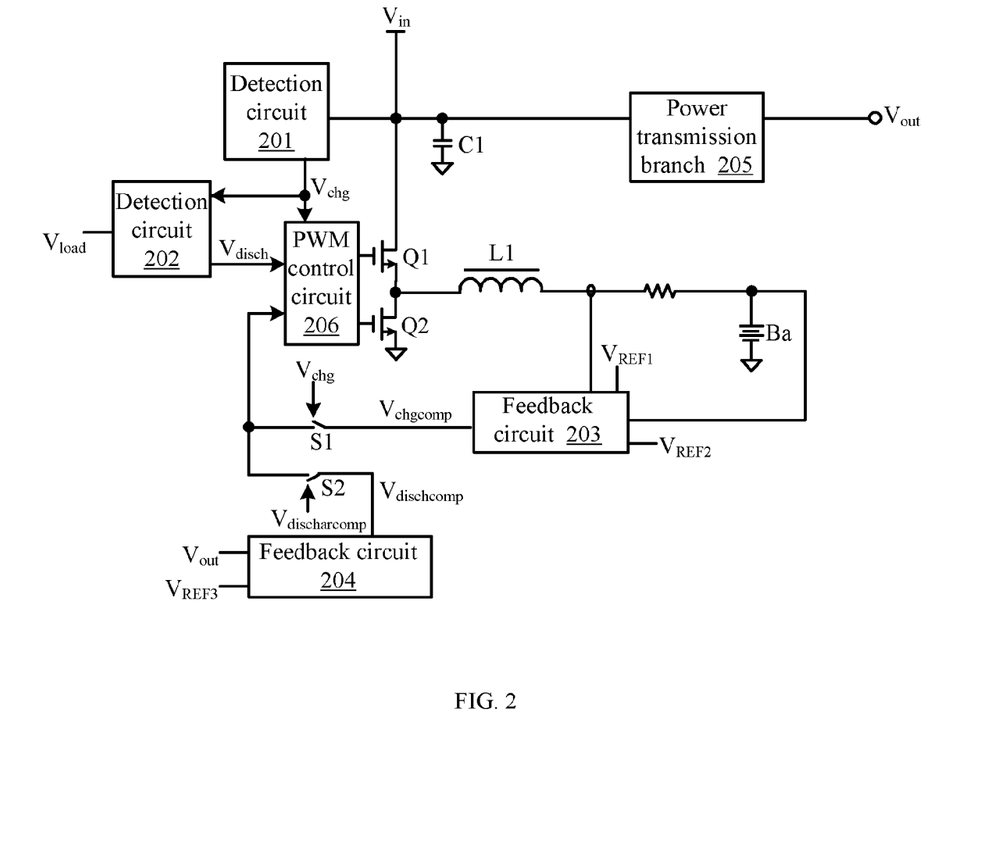
FIG. 2 is a schematic diagram of a high efficiency bi-directional DC converter in accordance with embodiments of the present invention.

Referring now to FIG. 2, shown is a schematic diagram of a high efficiency bi-directional DC converter in accordance with embodiments of the present invention. This example bi-directional DC converter can include an input port to receive an external input power supply, an output port to supply power for a load, and a battery Ba. For example, the battery may include a lithium battery, but other battery types, such as any rechargeable battery, can also be employed in particular embodiments. In addition, the bi-directional DC converter can include input capacitor C1, power switches Q1 and Q2, and resistor R1. Also, this bi-directional DC converter may include only one magnetic element (e.g., inductor L1). The detection circuitry can include detection circuits 201 and 202, as well as feedback circuits 203 and 204, power transmission branch 205, and PWM control circuit 206.

For example, the detection circuitry can detect input current of the input port in order to determine whether the input power supply is present at the input port. Specifically, detection circuit 201 can be used to detect the input current of the bi-directional DC converter to generate detection signal $V_{chg}$. Detection circuit 202 can receive detection signal $V_{chg}$ and a voltage signal that indicates a load state of the bi-directional DC converter, and may generate detection signal $V_{disch}$ according to the load state and detection signal $V_{chg}$. The state of the load can be detected by a load detection circuit (not shown), and denoted by voltage signal $V_{load}$. For example, when the load is in a valid state, voltage signal $V_{load}$ may be at a logic high level, while voltage signal $V_{load}$ may be in a logic low level when the load is in an invalid state.

Any suitable type of detection circuitry for detecting the presence of an input power supply at an input port can be utilized in particular embodiments. As discussed above, input current can be detected in order to determine the presence of the input power supply. Other approaches, such as voltage detection and/or comparison against other voltage levels, can also be supported. In addition, any suitable load detection circuitry (e.g., current and/or voltage sensing) can be employed in particular embodiments. For example, a load state can be considered valid ($V_{load}$ is high) when a load is present at an output port (e.g., as supplied by $V_{out}$), or a load that is present in seat power from the DC converter. A current and/or voltage threshold for load detecting can be predetermined in particular embodiments.

Feedback circuit 203 can compare a current feedback signal of the battery against reference voltage $V_{REF1}$ to generate a first error signal. Feedback circuit 203 can also compare a voltage feedback signal of the battery against reference voltage $V_{REF2}$ to generate a second error signal. For example, feedback circuit 203 can then select a lower of the first and second error signals to generate feedback signal $V_{chgcomp}$. Other ways of generating feedback signal $V_{chgcomp}$ can also be supported in particular embodiments. For example, a higher of the first and second error signals can be used to generate feedback signal $V_{chgcomp}$, or any other suitable combination or comparison of such error signals can be employed to generate feedback signal $V_{chgcomp}$. In particular embodiments, a lower voltage level error signal can be used to turn on a diode, thus utilizing that error signal in generating the corresponding feedback signal.

Feedback circuit 204 can compare output voltage $V_{out}$ of the bi-directional DC converter against reference voltage $V_{REF3}$ to generate feedback signal $V_{dischcomp}$. When the input power supply is detected at the input port, PWM control circuit 206 can control the bi-directional DC converter to operate in a first operation mode according to detection signal $V_{chg}$ and feedback signal $V_{chgcomp}$. For example, the first operation mode may be a synchronous buck mode. Input capacitor C1, power switches Q1 and Q2, and inductor L1 can form a synchronous buck converter to charge battery Ba with the input power. A buck converter mode can involve step down DC to DC voltage conversion in a switch mode power supply configuration. In this case, a single inductor L1 is utilized, with power switches Q1 and Q2, as controlled by PWM control circuit 206.

When no input power supply is detected at the input port, and the load is in a valid state, PWM control circuit 206 can control the bi-directional DC converter to operate in a second operation mode according to detection signal $V_{disch}$ and feedback signal $V_{dischcomp}$. For example, the second operation mode may be a synchronous boost mode. The synchronous boost converter, which can include input capacitor C1, power switches Q1 and Q2, and inductor L1, can transfer battery energy to the output port to supply the load. A boost or step-up converter mode can involve DC to DC power conversion with an output voltage greater than its input voltage. This is also a type of switch or switched-mode power supply (SMPS), and can include at least two semiconductor switches (e.g., a diode and a transistor, or two transistors) and at least one energy storage element (e.g., battery Ba), a capacitor (e.g., C1), inductor (e.g., L1), or the two in combination. Also, filters that utilize capacitors can be included at the DC converter output of the boost converter and/or the buck converter arrangements or modes in order to further reduce output voltage ripple In this fashion, bi-directional energy transmission or current flow can be achieved in particular embodiments. When an input power supply is detected, the bi-directional DC converter can operate in a buck mode, and may store remaining input power at the input port in lithium battery Ba after load requirements have been satisfied. When no input power supply is detected as present in the input port, the bi-directional DC converter can operate in a boost mode, and may output energy stored in lithium battery Ba to the output port to supply the load. Also, energy may pass through inductor L1 in both of the first operation mode (e.g., synchronous buck mode) and the second operation mode (e.g., synchronous boost mode). In particular embodiments, inductor L1 may be the only magnetic element in the DC converter. This approach can reduce the number of circuit components, simplify the control circuit structure, and retain high efficiency.

Figure 3A:
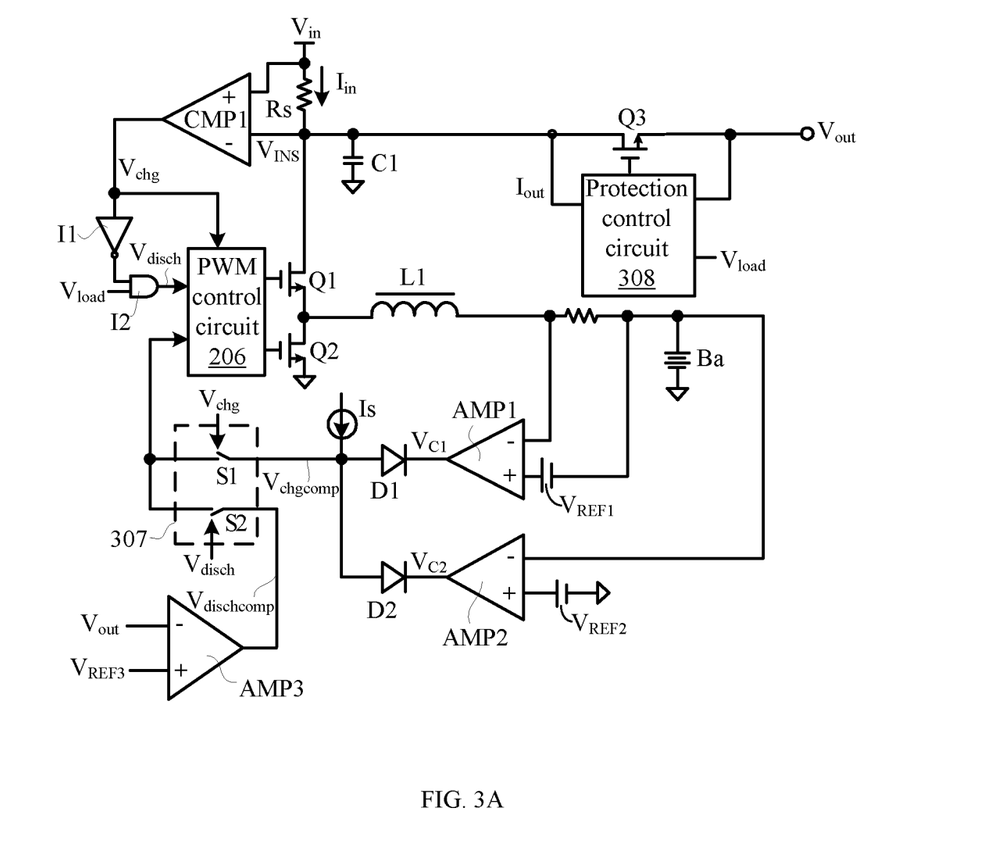
FIG. 3A is a schematic diagram of a first example high efficiency bi-directional DC converter in accordance with embodiments of the present invention.

Referring now to FIG. 3A, shown is a schematic diagram of a first example high efficiency bi-directional DC converter in accordance with embodiments of the present invention. This diagram shows example implementations of detection circuits 201 and 202, feedback circuits 203 and 204, and power transmission branch 205. Detection circuit 201 can include detection resistor Rs and comparator CMP1. Detection resistor Rs can receive input voltage $V_{in}$, and the voltage at a node of detection resistor Rs is labeled $V_{INS}$. Comparator CMP1 can receive input voltage and resistor voltage $V_{INS}$, and can generate detection signal $V_{chg}$. Detection circuit 202 can include inverter I1 and AND-gate I2. Inverter I1 can receive detection signal $V_{chg}$, and may provide an inverted version of detection signal $V_{chg}$ to AND-gate I2. AND-gate I2 can also receive voltage signal $V_{load}$ that denotes the load state (indicating a valid or invalid load state), and can generate detection signal $V_{disch}$.

Feedback circuit 203 can also include a current control loop, a voltage control loop, and selection circuitry. For example, the current control loop can include amplifier AMP1, which can compare a current feedback signal of the battery against reference voltage $V_{REF1}$, to generate error signal $V_{C1}$. For example, the current feedback of the battery can be obtained by sensing current on a battery terminal through resistance. The voltage control loop can include amplifier AMP2, which can compare a current feedback signal of the battery against reference voltage $V_{REF2}$, and may generate error signal $V_{C2}$. Selection circuitry can receive error signals $V_{C1}$ and $V_{C2}$, and may select a lower one (e.g., lower voltage level) as feedback signal $V_{chgcomp}$. For example, current source Is and diodes D1 and D2 can be utilized to select the lower of error signals $V_{C1}$ and $V_{C2}$ by turning on the corresponding diode D1 or D2 to sink current from current source Is and set the level of feedback signal $V_{chgcomp}$. Of course, other circuits to implement error signal selection can also be employed in particular embodiments.

Feedback circuit 204 can also include amplifier AMP3, which can receive output voltage $V_{out}$ of the bi-directional DC converter and reference voltage $V_{REF3}$. Amplifier AMP3 can output feedback signal $V_{dischcomp}$ as shown. Further, the bi-directional DC converter can include selection circuit 307 that includes switches (e.g., transistors) S1 and S2. In this example, switch S1 can be controlled by detection signal $V_{chg}$, and switch S2 can be controlled by detection signal $V_{disch}$. Switch S1 can receive feedback signal $V_{chgcomp}$, and switch S2 can receive feedback signal $V_{dischcomp}$. The output of selection circuit 307 can be at a common node of switches S1 and S2, and may connect to PWM control circuit 206. According to the switch states of switches S1 and S2 (which can depend on the input supply detection result), selection circuit 307 can select either feedback signal $V_{chgcomp}$ or feedback signal $V_{dischcomp}$, to provide control to PWM control circuit 206.

Power transmission branch 205 can include switch Q3 and protection control circuit 308. Switch (e.g., transistor) Q3 can be coupled to the input and output ports of the bi-directional DC converter, and may be controlled by an output of protection control circuit 308. Protection control circuit 308 can receive voltage signal $V_{load}$ denoting the load state, output voltage $V_{out}$, and current signal $I_{out}$ which flows through switch Q3. Thus, current signal $I_{out}$ can be a current sense of the current passing through transistor Q3. When voltage signal $V_{load}$ is high, protection control circuit 308 can adjust and control the current and output voltage of switch Q3 by controlling its transistor gate to protect the input power supply and output load, according to output voltage $V_{out}$ and current signal $I_{out}$.

When an input power supply is present, current $I_{in}$, that flows through detection resistor Rs may be greater than zero. In response, detection signal $V_{chg}$ output from comparator CMP1 can go high, and detection signal $V_{disch}$ can go low, to indicate detection of the input power supply $V_{in}$. Due to these example detection signal states, switch S1 may be on, and switch S2 can be off. PWM control circuit 206 can receive feedback signal $V_{chgcomp}$ and detection signal $V_{chg}$ to control the switching action of power switches (e.g., transistors) Q1 and Q2. In this way, the bi-directional DC converter can be configured to operate in a synchronous buck mode (the first operation mode) to charge lithium battery Ba.

For example, when error signal $V_{C1}$ is less than error signal $V_{C2}$, error signal $V_{C1}$ may be treated as feedback signal $V_{chgcomp}$ to be transferred to PWM control circuit 206, and lithium battery Ba can be charged in a constant current charging mode in the synchronous buck configuration. When error signal $V_{C2}$ is less than error signal $V_{C1}$, error signal $V_{C2}$ can be treated as the feedback signal $V_{chgcomp}$ to be transferred to PWM control circuit 206, and lithium battery Ba can be charged in a constant voltage charging mode in the synchronous buck configuration. Also, when the load is in a valid state, switch Q3 can be turned on, and input power supply $V_{in}$, besides charging lithium battery Ba through power switches Q1 and Q2, can also power the load at $V_{out}$. Thus, the first operation mode, in some cases, can also include providing power to the load via $V_{out}$.

When there is no input power supply detected, input current $I_{in}$ can be equal to zero, and detection signal $V_{chg}$ may go low. At this time, if the load is in a valid state and voltage signal $V_{load}$ is high, detection signal $V_{disch}$ can be high and switch S2 may be on while switch S1 can be turned off. PWM control circuit 206 can receive feedback signal $V_{dischcomp}$ and detection signal $V_{disch}$ to control the switching actions of power switches Q1 and Q2, in order to make the bi-directional DC converter operate in a synchronous boost mode (the second operation mode). Further, protection control circuit 308 can control switch Q3 to turn on, and power stored in lithium battery Ba can be converted to output voltage $V_{out}$ to be provided to the load through the power transmission branch. Here, the power transmission branch can adjust the output voltage by controlling switch Q3. For example, when the lithium battery voltage is greater than the voltage required by the load, the power transmission branch can adjust the voltage drop of switch Q3 to reduce the output voltage, in order to supply a stable voltage to the load via $V_{out}$.

In particular embodiments, a bi-directional DC converter can operate in a synchronous buck mode to charge a lithium battery when an input power supply is detected at an input port. When no input power supply is present or detected, the bi-directional DC converter can operate in a synchronous boost mode to reversely transfer power from the lithium battery to the output port to supply a load. In addition, energy of the input power supply or the battery can pass to the output load through a power transmission branch. Further, the power transmission branch can provide current-limiting and/or voltage-limiting protection for the input power supply, and/or a stable voltage to the load. The power transmission branch can receive current sense information (e.g., $I_{out}$) and voltage state information (e.g., $V_{load}$) in order to adjust and control a switch coupled between the input and output ports of the DC converter.

Figure 3B:
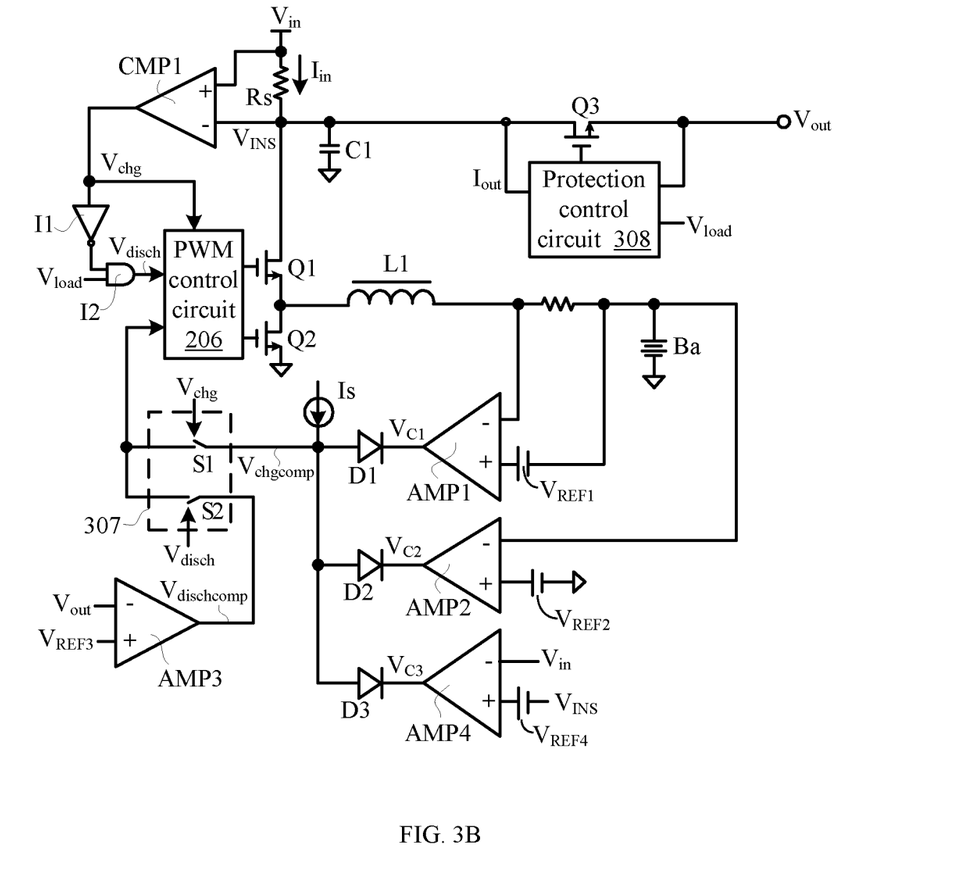
FIG. 3B is a schematic diagram of a second example high efficiency bi-directional DC converter in accordance with embodiments of the present invention.

Referring now to FIG. 3B, shown is a schematic diagram of a second example high efficiency bi-directional DC converter in accordance with embodiments of the present invention. In this example, an input current limiting circuit is included to address a possible condition in the feedback circuitry that generates feedback signal $V_{chgcomp}$ that may be caused by insufficient power for a preceding stage. The input current limiting circuit can include amplifier AMP4 which can compare input voltage against a sum of resistor voltage $V_{INS}$ and reference voltage $V_{REF4}$, to generate error signal $V_{C3}$. Correspondingly, the selection circuitry can include diode D3 as shown. When one of error signals $V_{C1}$, $V_{C2}$, and $V_{C3}$ is low, or lower than the other error signals, the corresponding diode can be turned on, and the lower error signal can be utilized as feedback signal $V_{chgcomp}$. In particular embodiments, reference voltages $V_{REF1}$, $V_{REF2}$, $V_{REF3}$, and $V_{REF4}$, can be predetermined, and may in some cases be user programmable in order to adjust various thresholds for generating corresponding error signals.

In this example, the selection circuitry can select a lowest voltage from among error signals $V_{C1}$, $V_{C2}$, and $V_{C3}$ as feedback signal $V_{chgcomp}$. When error signal $V_{C1}$ is transferred to PWM control circuit 206 as feedback signal $V_{chgcomp}$, lithium battery Ba can be charged in a constant current charging mode. When error signal $V_{C2}$ is utilized as feedback signal $V_{chgcomp}$ and transferred to PWM control circuit 206, lithium battery Ba can be charged in a constant voltage charging mode. When error signal $V_{C3}$ is transferred to PWM control circuit 206 as feedback signal $V_{chgcomp}$, PWM control circuit 206 can control power switches Q1 and Q2 and inductor L1 to charge battery Ba with, e.g., a maximum current as permitted by input power supply $V_{in}$. In this case, when the load is in a valid state, switch Q3 can be turned on, and the power transmission branch can initially satisfy the load requirement from the input power, and remaining input power can be used to charge battery Ba.

By the design of the input current limiting circuit, the bi-directional DC converter of particular embodiments can be utilized under conditions when the input current should be limited. In such cases, the battery can be charged with a maximum current as may be permitted by the input power supply. Also, when there is a load (e.g., the load is in a valid state), the input current limiting circuit can be used to ensure that sufficient power is provided for the load, and remaining input power can be utilized to charge the battery. In this way, overall system efficiency can be improved by transferring power directly from the input power source to the load as a priority over charging the battery.

In one embodiment, a method of controlling a bi-directional DC converter, can include: (i) detecting whether there is an input power supply at an input port, where the bi-directional DC converter comprises a single magnetic element; (ii) operating the bi-directional DC converter in a first operation mode to charge a battery when the input power supply is detected at the input port; (iii) operating the bi-directional DC converter in a second operation mode to transfer power from the battery to an output port for a load when the input power supply is not detected at the input port; and (iv) transferring power through the single magnetic element in both the first operation mode and the second operation mode.

Figure 4:
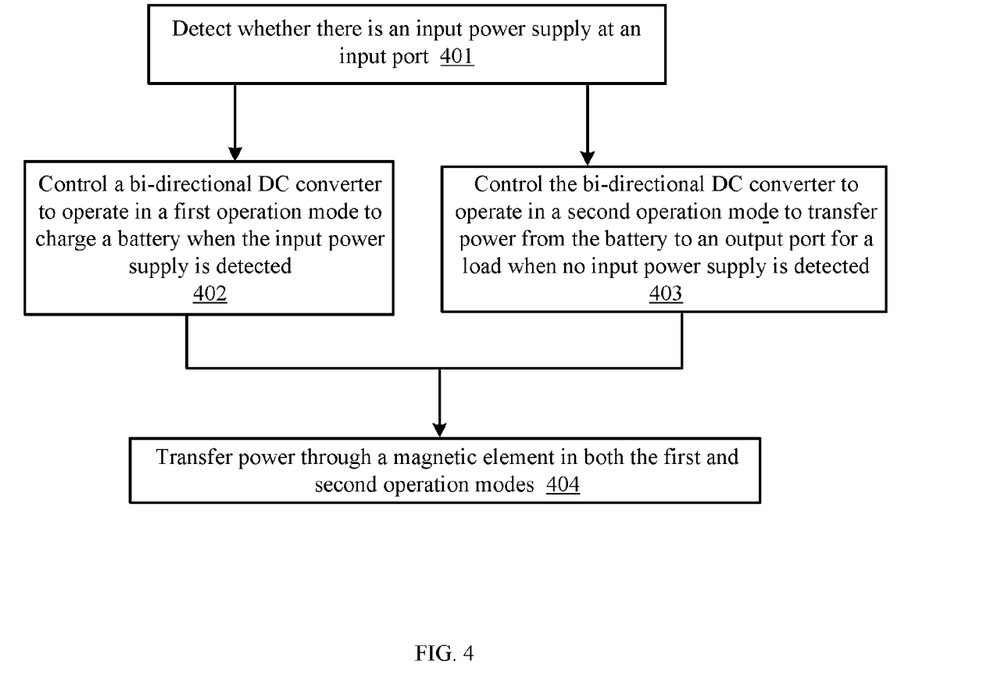
FIG. 4 is a flow diagram of an example method of controlling a high efficiency bi-directional DC converter, in accordance with embodiments of the present invention.

Referring now to FIG. 4, shown is a flow diagram of an example method of controlling a high efficiency bi-directional DC converter, in accordance with embodiments of the present invention. The bi-directional DC converter can include a battery, input and output ports, and only one magnetic element (e.g., inductor L1). In this example, at S401, whether there is an input power supply at the input port can be detected. As discussed above, various types of detection circuitry (e.g., detection of a current flow through a resistor), such as detection circuits 201 and 202, can be utilized to determine if an input power supply (e.g., $V_{in}$) is present at the input port.

At S402, if the input power supply is detected at the input port, the bi-directional DC converter can operate in a first operation mode (e.g., synchronous buck mode) to charge the battery through inductor L1. At S403, if no input power supply is detected at the input port, the bi-directional DC converter can operate in a second operation mode (e.g., synchronous boost mode) to transfer power from the battery to the output port via output supply $V_{out}$ for a load. At S404, energy transmission can occur through the magnetic element in both the first and second operation modes. Thus, inductor L1 can be utilized in a bi-directional fashion in the first and second operation modes.

In addition, a power transmission branch can be included between the input and output ports. The power of the input power supply or the battery can be transferred to the output port for the load through the power transmission branch. For example, according to the value of the input power supply and current requirements of the load, the power transmission branch can control the current and/or voltage of the power transmission branch via transistor Q3 to protect the input power supply and the load at the output port. When the input power supply is detected at the input port, the charging current of the battery can be adjusted according to the load status of the bi-directional DC converter and the value of the input power supply, to ensure that the battery is charged at a maximum power and the input power supply may not be overloaded.

In summary, bi-directional DC converter circuits and methods can control the bi-directional DC converter to operate in a synchronous buck mode or a synchronous boost mode to realize bi-directional transmission of power based on detecting whether there is the input power supply. In the two operation modes, the energy transmission can occur through the same magnetic element, by which the number of the magnetic elements in the overall circuit is reduced. In addition, particular embodiments can include a power transmission branch to transfer energy of the input power or the battery to the output port. Also, particular embodiments can include current limitation and overvoltage protection in order to protect the input power supply and the load. Further, in cases where the input current should be limited, the bi-directional DC converter may initially satisfy power requirements of the load, and then utilize remaining input power to charge the battery in a prioritized fashion.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of controlling a bi-directional DC converter, the method comprising:
   a) detecting whether there is an input power supply at an input port, wherein said bi-directional DC converter comprises a single magnetic element;
   b) operating said bi-directional DC converter in a first operation mode to charge a battery when said input power supply is detected at said input port;
   c) operating said bi-directional DC converter in a second operation mode to transfer power from said battery to an output port for a load when said input power supply is not detected at said input port;
   d) transferring power through said single magnetic element in both said first operation mode and said second operation mode;
   e) comparing, by a first feedback circuit, a current feedback signal of said battery against a first reference voltage to generate a first error signal, comparing a voltage feedback signal of said battery against a second reference voltage to generate a second error signal, and generating a first feedback signal by selecting a lesser of said first and second error signals;
   f) comparing, by a second feedback circuit, an output voltage at said output port against a third reference voltage, and generating a second feedback signal; and
   g) providing, by a first selection circuit, one of said first and second feedback signals to a pulse-width modulation (PWM) control circuit that controls a charging current of said battery according to said first feedback signal, or said output voltage according to said second feedback signal.

2. The method of claim 1, further comprising transferring power from said battery or said input port to said output port by using a power transmission branch coupled between said input port and said output port.

3. The method of claim 2, further comprising controlling a current and an output voltage of said power transmission branch to protect said input power supply and said load of said output port.

4. The method of claim 2, wherein said operating said bi-directional DC converter in said first operation mode comprises adjusting a charging current of said battery according to a load current requirement of said bi-directional DC converter and a value of said input power supply.

5. The method of claim 4, wherein said adjusting said charging current of said battery comprises ensuring that said battery is charged at a maximum power and said input power supply will not be overloaded.

6. The method of claim 1, wherein said first operation mode comprises a synchronous buck mode.

7. The method of claim 1, wherein said second operation mode comprises a synchronous boost mode.

8. A bi-directional DC converter, comprising:
   a) a single magnetic element through which power is configured to be transferred in both a first operation mode and a second operation mode;
   b) a detection circuit configured to determine whether there is an input power supply at an input port;
   c) said bi-directional DC converter being configured to operate in said first operation mode to charge a battery when said input power supply is detected at said input port, and to operate in said second operation mode to transfer power from said battery to an output port for a load when said input power supply is not detected at said input port;
   d) a first feedback circuit configured to compare a current feedback signal of said battery against a first reference voltage to generate a first error signal, to compare a voltage feedback signal of said battery against a second reference voltage to generate a second error signal, and to generate a first feedback signal by selecting a lesser of said first and second error signals;
   e) a second feedback circuit configured to compare an output voltage at said output port against a third reference voltage, and to generate a second feedback signal; and
   f) a first selection circuit configured to provide one of said first and second feedback signals to a pulse-width modulation (PWM) control circuit that is configured to control a charging current of said battery according to said first feedback signal, or said output voltage according to said second feedback signal.

9. The bi-directional DC converter of claim 8, further comprising a power transmission branch coupled between said input port and said output port, wherein said power transmission branch is configured to transfer power from said input power supply or said battery to said output port for said load.

10. The bi-directional DC converter of claim 9, wherein said power transmission branch is configured to control a current and said output voltage to protect said input power supply and said load of said output port.

11. The bi-directional DC converter of claim 9, wherein said bi-directional DC converter comprises a load detection circuit configured to detect a load condition, and wherein said power transmission branch is configured to be on when said load is detected as a valid state.

12. The bi-directional DC converter of claim 8, wherein said detection circuit is configured to detect an input current of said input port to determine whether said input power supply is at said input port.

13. The bi-directional DC converter of claim 12, wherein:
   a) said input power supply is detected at said input port when said input current is greater than zero; and
   b) said input power supply is not detected at said input port when said input current equals zero.

14. The bi-directional DC converter of claim 8, further comprising an input current limiting circuit configured to limit an input current of said input power supply when said input power supply is detected at said input port.

15. The bi-directional DC converter of claim 8, wherein said first operation mode comprises a synchronous buck mode.

16. The bi-directional DC converter of claim 8, wherein said second operation mode comprises a synchronous boost mode.

17. The bi-directional DC converter of claim 9, wherein said power transmission branch comprises:
   a) a third switch coupled between said input port and said output port; and
   b) a protection and control circuit configured to control said third switch to regulate said output voltage.

18. The bi-directional DC converter of claim 17, wherein said protection and control circuit is configured to control said third switch to regulate a current flowing through said third switch.

19. The bi-directional DC converter of claim 14, wherein said input current limiting circuit comprises:
   a) a detection resistor configured to detect an input current of said input power supply to generate a resistance voltage; and
   b) said input current limiting circuit being configured to compare said input power supply against a sum of said resistance voltage and a fourth reference voltage, and to generate a third error signal, wherein said first feedback circuit is configured to select a lesser from among said first error signal, said second error signal, and said third error signal, to generate said first feedback signal.

20. The bi-directional DC converter of claim 14, wherein said charging current is controlled to be a maximum value when said input power supply is detected at said input port.

* * * * *